United States Patent
Wholey

(10) Patent No.: US 8,746,480 B2
(45) Date of Patent: Jun. 10, 2014

(54) ANTI SIPHON TANK INLET

(75) Inventor: Ryan Wholey, Blackpool (GB)

(73) Assignee: TISS Limited, Blackpool, Lancs (GB)

( * ) Notice: Subject to any disclaimer, the term of this patent is extended or adjusted under 35 U.S.C. 154(b) by 698 days.

(21) Appl. No.: 12/937,373

(22) PCT Filed: Apr. 9, 2009

(86) PCT No.: PCT/GB2009/000932
§ 371 (c)(1),
(2), (4) Date: Oct. 12, 2010

(87) PCT Pub. No.: WO2009/127812
PCT Pub. Date: Oct. 22, 2009

(65) Prior Publication Data
US 2011/0031245 A1    Feb. 10, 2011

(30) Foreign Application Priority Data

Apr. 15, 2008 (GB) .................................. 0806811.6
Aug. 20, 2008 (GB) .................................. 0815192.0

(51) Int. Cl.
*B60K 15/04* (2006.01)

(52) U.S. Cl.
USPC ........................... 220/86.3; 141/286; 141/348

(58) Field of Classification Search
USPC ................. 141/348–350, 286; 220/86.2–86.3
See application file for complete search history.

(56) References Cited

U.S. PATENT DOCUMENTS

| | | | |
|---|---|---|---|
| 1,512,065 A | 10/1924 | Taylor | |
| 1,813,554 A * | 7/1931 | Wickline | 220/86.3 |
| 1,931,335 A | 10/1933 | Terry | |
| 2,104,132 A | 1/1938 | McGillicuddy et al. | |
| 2,145,759 A | 1/1939 | Fellows et al. | |
| 2,313,266 A | 3/1943 | Roberts | |
| 3,552,435 A | 1/1971 | Anderson et al. | |
| 3,951,297 A | 4/1976 | Martin | |
| 4,123,598 A | 10/1978 | Hammel | |
| 4,345,694 A * | 8/1982 | Chambers | 220/86.3 |
| 4,630,748 A * | 12/1986 | Keller | 220/86.3 |
| 4,718,568 A | 1/1988 | Dal et al. | |
| 4,997,731 A | 3/1991 | Machida et al. | |
| 5,025,946 A * | 6/1991 | Butkovich et al. | 220/86.3 |
| 6,087,038 A | 7/2000 | Flament et al. | |
| 6,399,238 B1 | 6/2002 | Oweis et al. | |
| 6,508,275 B1 | 1/2003 | Sadr et al. | |

(Continued)

FOREIGN PATENT DOCUMENTS

EP    0 741 089    11/1996
EP    0 901 926     3/1999

(Continued)

*Primary Examiner* — Gregory Huson
*Assistant Examiner* — Nicolas A Arnett
(74) *Attorney, Agent, or Firm* — Hamilton DeSanctis & Cha

(57) ABSTRACT

This invention relates to inlet devices that include, for example, a tubular inlet body having a central bore defined by a tubular wall and having an axis. The tubular wall defines an open proximal end for receiving fuel. A plurality of apertures are provided through the tubular wall for egress of fuel. The distal end of the tubular body is blocked by a baffle defining a baffle surface facing into the bore of the tubular body, wherein at least a portion of the baffle surface is inclined at an acute angle relative to the axis to deflect fuel towards apertures in the tubular wall; and wherein the baffle surface is at least substantially free from apertures.

20 Claims, 6 Drawing Sheets

(56) References Cited

U.S. PATENT DOCUMENTS

| | | | |
|---|---|---|---|
| 6,679,396 B1 * | 1/2004 | Foltz et al. | 220/86.2 |
| 6,783,886 B1 | 8/2004 | Sakakibara | |
| 6,811,921 B2 | 11/2004 | Dansui | |
| 6,933,076 B2 | 8/2005 | Ura | |
| 7,302,968 B2 * | 12/2007 | Stuart | 137/592 |
| 7,404,498 B2 * | 7/2008 | Hattori et al. | 220/86.3 |
| 7,584,766 B2 * | 9/2009 | David et al. | 137/413 |
| 8,122,904 B2 * | 2/2012 | Wholey et al. | 137/429 |
| 2004/0079420 A1 * | 4/2004 | Stuart | 137/592 |
| 2009/0134159 A1 * | 5/2009 | Wholey et al. | 220/86.3 |

FOREIGN PATENT DOCUMENTS

| | | | |
|---|---|---|---|
| EP | 1 325 830 | | 7/2003 |
| EP | 1 724 145 | | 11/2006 |
| EP | 1 782 993 | | 5/2007 |
| GB | 2 382 568 | | 6/2003 |
| NL | 1030117 | * | 6/2007 |
| WO | WO 2006/048659 | | 5/2006 |
| WO | WO 2006/106283 | | 10/2006 |

* cited by examiner

ANTI SIPHON TANK INLET

CROSS REFERENCE TO RELATED APPLICATION

The present application claims priority to (is a national stage filing of) PCT Application PCT/GB2009/000932 filed Apr. 9, 2009, which claims priority to British Patent Application No. GB0815192.0 filed Aug. 20, 2008 and British Patent Application No. GB0806811.6 filed Apr. 15, 2008. The entirety of each of the aforementioned references is incorporated herein by reference for all purposes.

BACKGROUND OF THE INVENTION

The present invention relates to an inlet for a fluid tank such as a vehicle fuel tank. In particular, the present invention relates to an anti-siphon inlet for a vehicle fuel tank.

The theft of fuel by siphoning from the fuel tanks of vehicles, and in particular commercial road vehicles, is a recognized problem. It is known to fit vehicles with a lockable fuel tank filler cap to prevent unauthorized access to the tank inlet. However, since the fuel filler cap is accessible it is vulnerable to tampering and can often be forced open by the determined thief. In addition, it is not always practical to fit a vehicle with a lockable fuel filler cap.

This problem has been addressed in the prior art by provision of a fluid tank inlet incorporating structure to prevent insertion of a siphon tube into the tank. For example, WO2006/048659 discloses an anti-siphon fluid tank inlet assembly comprising a tubular inlet body which in use is secured to the normal tank inlet so that its distal end extends a short distance in to the tank. The tubular inlet is designed to receive a conventional fuel dispensing nozzle. A conically shaped baffle is provided at the distal end of the tubular inlet to prevent insertion of a siphon tube through the tubular inlet and into the tank below. Both the tubular wall and the conical baffle are provided with apertures sized to allow the egress of fuel but block insertion of a siphon tube of any practical diameter. The inlet is designed so that fuel hitting the conical baffle either passes through the apertures in the baffle or is deflected towards apertures in the tubular body.

With such anti-siphon inlets, fuel can only be siphoned to the extent that the fuel level is above the base of the conical baffle. It is therefore desirable for the tubular body to be as short as possible. However, the shorter the tubular body the more prone the inlet becomes to the problem of "backflow". That is, if fuel does not flow through the inlet at a minimum rate, fuel can well up within the inlet and either spit out of the inlet or cause sufficient back-pressure to activate the filler nozzle automatic shut-off mechanism thereby interrupting fuel delivery.

Hence, there exists a need in the art for systems and methods to mitigate the aforementioned limitations.

BRIEF SUMMARY OF THE INVENTION

The present invention relates to an inlet for a fluid tank such as a vehicle fuel tank. In particular, the present invention relates to an anti-siphon inlet for a vehicle fuel tank.

According to a first aspect of the present invention there is provided a fluid tank inlet device comprising:
- a tubular inlet body having a central bore defined by a tubular wall and having an axis; the tubular wall defining an open proximal end for receiving fuel;
- a plurality of apertures provided through the tubular wall for egress of fuel;
- wherein the distal end of the tubular body is blocked by a baffle defining a baffle surface facing into the bore of the tubular body,
- wherein at least a portion of the baffle surface is inclined at an acute angle relative to the axis to deflect fuel towards apertures in the tubular wall; and
- wherein the baffle surface is at least substantially free from apertures.

The It has been found that apertures provided in the baffle of known inlet structures such as that described in WO2006/048659 referenced above hinder rather than improve fluid flow through the inlet. This is believed to be the result of turbulence induced in the fuel by the presence of apertures in the baffle. In accordance with the present invention elimination of apertures in the baffle reduces turbulence and directs all fluid flow to the apertures in the tubular wall. For a given length of tubular body, the invention improves fluid flow and increases the speed of flow through the inlet that can be achieved without encountering problems due to backflow. Accordingly, the rate of fuel delivery can either be speeded up or the length of the tubular body can be reduced for a given fuel delivery rate. The latter feature is of particular benefit as by reducing the length of the tubular body the amount of fuel potentially exposed to theft by siphoning is reduced.

In accordance with some embodiments of the present invention there are no apertures at all through the baffle. However, an improvement over the prior art can be expected simply by reducing the number of apertures through the baffle. Accordingly embodiments of the present invention preferably have at least about 75% of the area of the baffle surface free from apertures. That is if the baffle is provided with one or more apertures, the apertures preferably do not take up more than about 25%, and preferably no more than 10%, of the baffle surface area. Some embodiments of the invention have no apertures through at least said inclined portion of the baffle surface, and may have no apertures at all through the baffle surface. In other embodiments of the invention, the baffle may comprise a single bore. In some embodiments the bore may extend parallel to the axis, whereas in other embodiments the bore may extend at an angle to the axis. The bore may open at one end to any appropriate portion of the baffle surface, however, preferably, the bore will open at one end to the apex of the baffle.

The inclined portion of the baffle surface (which may be the whole of the baffle surface) is preferably defined by a surface of revolution around an axis, which is preferably the axis of the tubular body. A surface of revolution will be understood to be generated by rotating a line around an axis (the line may meet the axis at the apex of the surface). The line may be a straight line so that the surface is conical, or may be curved. A convex curve will for instance generate a domed surface, whereas a concave curve will generate a horn shaped surface. The inclined portion of the baffle surface may be truncated, in that it is flattened below the apex of a surface of revolution. However, in preferred embodiments of the invention the inclined portion of the baffle surface rises to an apex. The apex preferably lies on the axis of the tubular body.

The terms "dome" and "domed" are used herein to refer to a surface of revolution (truncated or otherwise) generated by a convex curved line, and covers any curve including for instance the arc of a circle, a parabola or any convex curve.

In some embodiments of the invention the inclined portion of the baffle surface may be defined by a surface of revolution centered on an axis offset from and/or angled to the axis of the tubular body. In yet other embodiments of the invention the inclined portion of the baffle surface need not be defined by a surface of revolution, but preferably still rises to an apex and most preferably an apex lying on the axis of the tubular body.

The baffle may have a substantially uniform thickness, with a surface facing away from the bore of the tubular body which has substantially the same configuration as the baffle surface facing the bore of the tubular body. Alternatively the baffle may be a solid block with a surface facing away from the bore of the tubular body which is substantially normal to the axis of the tubular body.

The whole of the baffle surface may be inclined at said acute angle, so that the inclined surface extends to the tubular wall at an acute angle to the tubular wall. The angle of inclination of the baffle surface relative to the axis may decrease towards the tubular wall so that the baffle may for instance meet the tubular wall at an angle of between 0 and 25 degrees. Alternatively the inclined portion of the baffle surface may be bordered by a substantially non-inclined portion at its periphery which meets the tubular wall substantially at right angles (so that the tubular wall is substantially perpendicular to a peripheral border portion of the baffle surface). However, in preferred embodiments the peripheral edge region of the baffle surface is radiused so that it curves outwardly towards the tubular wall.

The baffle may be formed integrally with the tubular body, for instance by casting or machining, or may be formed separately from the tubular body and subsequently fitted thereto.

Both the tubular body and the baffle are preferably fabricated from metal or other strong material that resists puncture by anyone trying to circumvent the anti-siphon protection of the baffle.

According to a second aspect of the present invention there is provided a fluid tank inlet device comprising:
  a tubular inlet body having a central bore defined by a tubular wall and having an axis;
  the tubular wall defining an open proximal end for receiving fuel;
  a plurality of apertures provided through the tubular wall for egress of fuel;
  wherein the distal end of the tubular body is blocked by a baffle defining a baffle surface facing into the bore of the tubular body,
  wherein at least a portion of the baffle surface is inclined at an acute angle relative to the axis to deflect fuel towards apertures in the tubular wall; and
  wherein the height of the baffle from its base to its apex is at least about 25% of the length of the tubular body.

The length of the tubular body may for instance be regarded as the length to which it will in use extend into the tank inlet. It will be appreciated that the "apex" of the baffle may not be a point, but may be flattened or rounded. In preferred embodiments of the second aspect of the invention the height of the baffle is at least about 35%, and most preferably at least about 40% of the length of the tubular body. In some embodiments of the invention the height of the baffle is between 45% and 55% of the length of the tubular body.

The baffle may have a configuration according to any of the possible embodiments of the first aspect of the present invention mentioned above. Similarly, the first and second aspects of the invention may be combined so that the baffle is at least substantially free from apertures.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention relates to an inlet for a fluid tank such as a vehicle fuel tank. In particular, the present invention relates to an anti-siphon inlet for a vehicle fuel tank.

Figure 1:
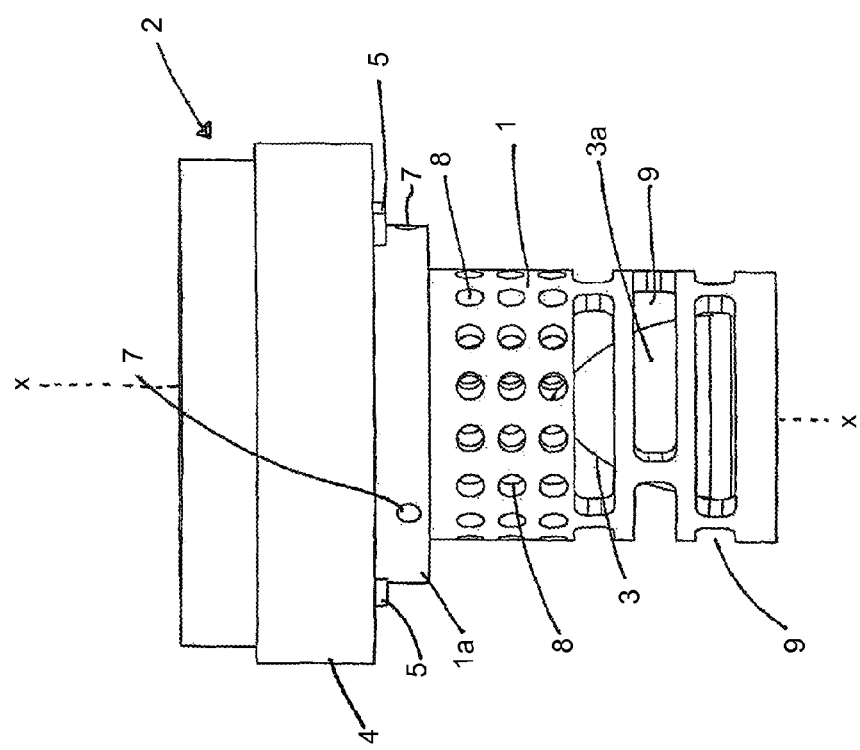
FIG. 1 is a side view of an embodiment of an anti-siphon inlet according to the present invention.
Figure 2:
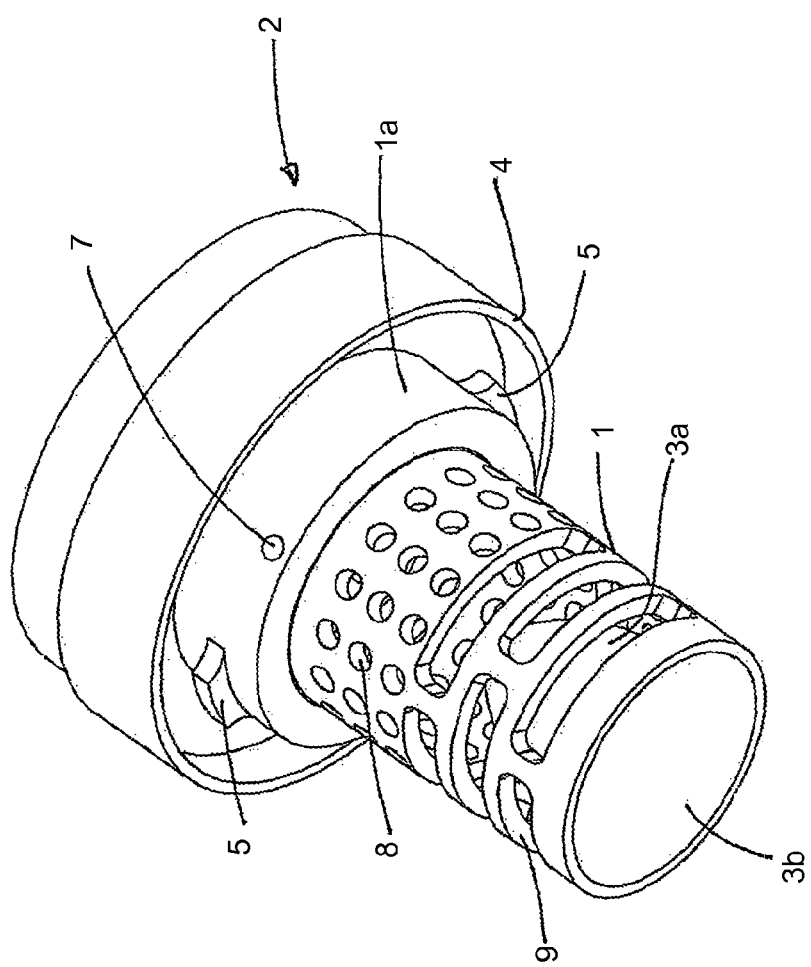
FIG. 2 is a perspective view from one end of the embodiment of FIG. 1.
Figure 3:
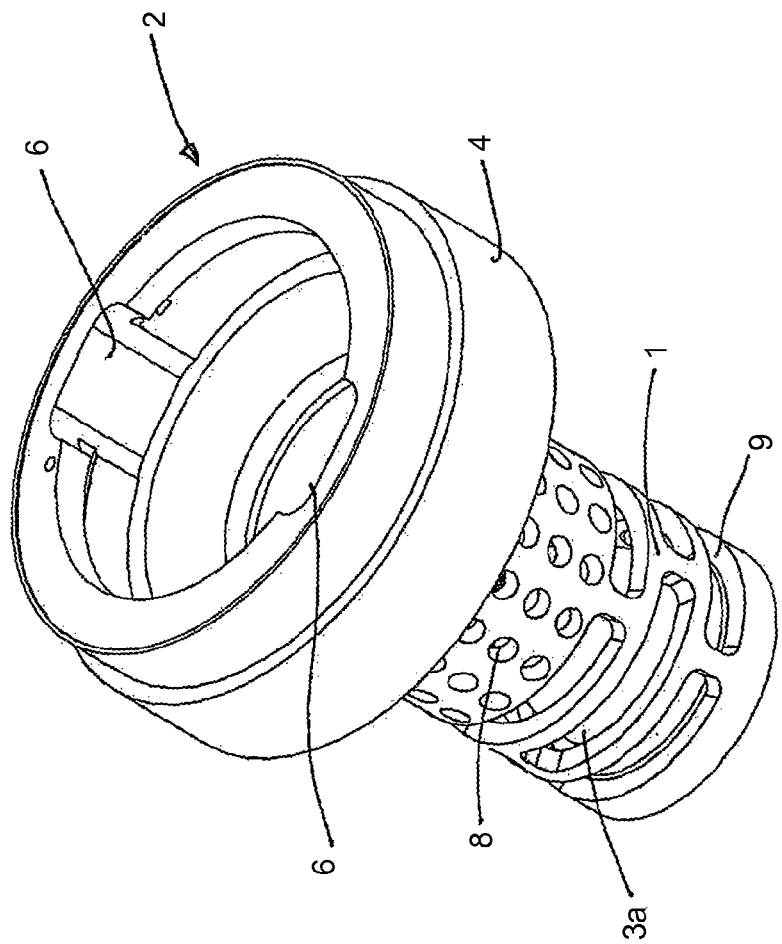
FIG. 3 is a perspective view from the other end of the embodiment of FIG. 1.

Referring first to FIGS. 1 to 3 of the drawings, the illustrated anti-siphon inlet is designed for installation in the inlet of a vehicle fuel tank (not shown) and comprises a cylindrical body 1 having an axis X and depending from an attachment means or mounting structure 2 at its proximal end. The inlet commonly comprises a length of pipe which leads to the fuel tank. The anti-siphon inlet is received by the fuel-tank and/or the inlet pipe. The distal end of the tubular body 1 is closed by a domed baffle 3 whereas the proximal end of the tubular body 1 is open to receive a conventional fuel dispensing nozzle.

The attachment means 2 comprises a collar 4 adapted to seat over the cylindrical neck of a conventional fuel tank inlet. Bayonet lugs 5 extend radially outward from a radially thickened annular portion 1a of the tubular body 1 towards the collar 5. The bayonet lugs 5 are adapted for engaging conventional bayonet fittings provided on a fuel tank inlet to receive a conventional fuel filler cap. Internally, the mounting structure 2 is provided with recesses 6 to receive the bayonet lugs of a conventional filler cap. Accordingly, the anti-siphon inlet is designed to be fitted to the inlet neck of a conventional fuel-tank inlet, and closed with a conventional fuel-filler cap. If necessary, the collar 4 may be fixed to the inlet tank neck, for instance using a suitable adhesive. Additionally, or alternatively, the inlet may be secured in the inlet tank neck by grub screws extending outwardly from the tubular body through holes 7 and engage the internal surface of the inlet neck.

The tubular body 1 is provided with a plurality of fuel flow apertures comprising holes 8 distributed around an upper portion of the tubular body 1, and elongate slots 9 distributed around a lower portion of the tubular body 1.

The baffle 3 defines a domed surface 3a facing into the bore of the tubular body 1 which rises from its base at the distal end of the tubular body 1 to an apex on the axis of the tubular body 1. The domed surface 3a of the baffle 3 is defined by a surface of revolution of a curved line rotated about the axis of the tubular body 1. The baffle 3 is a solid block so that its bottom surface 3b is circular and planar.

The baffle 3 extends approximately 50% along the length of the tubular body 1 in the illustrated embodiment, and is entirely free from apertures. The length of the tubular body is its extent between its distal end and its proximal end where it joins the mounting structure 2.

In use, a conventional fuel dispensing nozzle is simply inserted into the open end of the tubular body through the mounting structure 2. Fuel flow from the filler nozzle is deflected by the domed baffle 3 towards the apertures in the tubular body, and in particular towards the elongate slots 9. Accordingly, all fluid flow is through apertures in the tubular body 1, and no fluid flows through the end of the tubular body which is closed by the baffle 3.

Whereas conventional wisdom suggests that the baffle 3 should be provided with fluid flow apertures, the present inventors have found that fluid flow through the inlet is in fact enhanced by eliminating such apertures so that fuel can flow only through apertures in the tubular body 1. That is, it has been found that apertures provided in the baffle 3 (as for instance taught by WO2006/048659 referenced above) do not provide any significant fluid flow but rather increase turbulence in the fluid within the inlet which increases the tendency of fuel to well up within the inlet and reduces the efficiency and speed of fluid flow through the inlet. For instance the present invention allows the length of the tubular body to be reduced (thereby reducing the volume of fuel potentially susceptible to theft) whilst permitting typical fuel dispensing rates.

Figure 4:
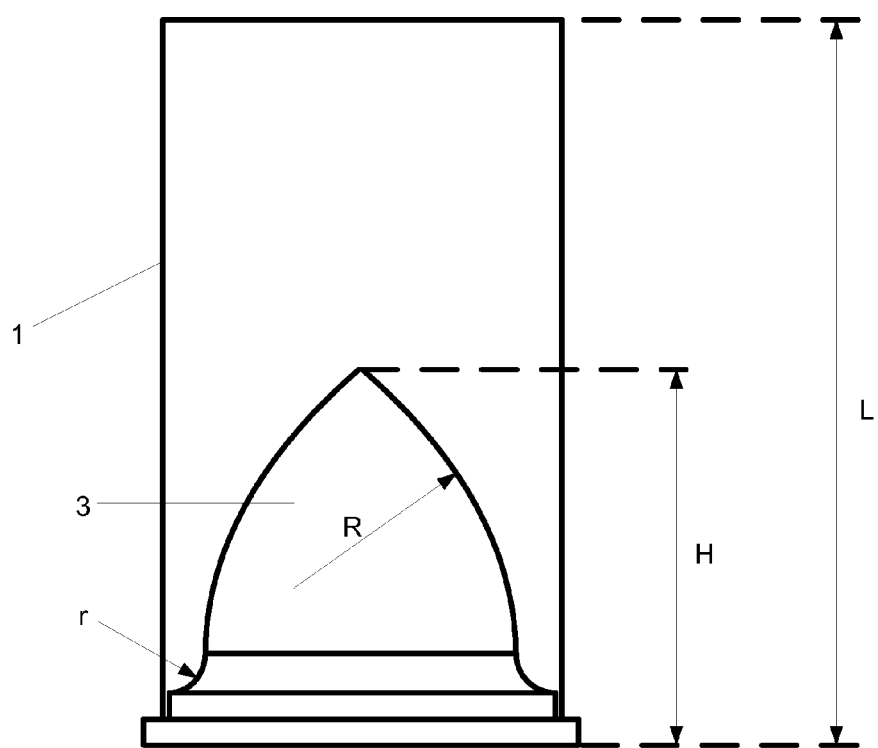
FIG. 4 is a schematic drawing showing the relative dimensions of an embodiment of the present invention.

FIG. 4 is a schematic cross-section through a tubular body 1 of an anti-siphon inlet according to the present invention revealing the cross-sectional profile of a domed baffle 3. It will be appreciated that FIG. 4 is a simplified drawing intended to exemplify the profile of a baffle 3 in accordance with the present invention, and the relative dimensions of the baffle 3 and tubular body 1. In one example of this embodiment, the length L of the tubular body is 68 mm and the height H of the domed baffle 3 is 31 mm. The domed surface 3a of the baffle 3 is defined by revolution of a curved line about the axis X of the tubular body, the curve of the line being an arc of a circle with a radius R of 43 mm. The base of the baffle 3 curves radially outwards with a radius r of 5 mm. This outward curvature of the base of the baffle 3 improves fuel flow.

It will be appreciated that in other embodiments of the invention the dimensions of the baffle, and the dimensions of the baffle relative to the dimensions of the tubular body 1, may vary from those illustrated in FIGS. 1 to 4. Similarly, the profile of the domed surface 3a of the baffle 3 may vary from that illustrated. However, it is preferred that the baffle extends to a height of more than about 25% of the length of the tubular body 1, and more preferably more than about 35% of the length of the tubular body 1. Such a height, coupled with the curvature of the surface, greatly hinders insertion of a siphon tube of any significant size into the inlet. For instance, for a siphon tube approaching the size of a conventional fuel filler nozzle, it would be difficult if not impossible to insert the siphon tube into the inlet body 1 past the apex of the baffle 3. This raises the level of fuel below which siphoning is practically possible, thereby limiting the amount of fuel that might be siphoned from a full fuel tank. For instance, with the known anti-siphon inlet described in WO2006/048659 referenced above, it is possible to insert a relatively large siphon tube to the base of the conical baffle and accordingly siphon fuel down to a level reaching the bottom of the inlet.

In addition, the domed baffle 3 according to the present invention is advantageously resistant to tampering. A method of circumventing known anti-siphon inlets, as for instance described in WO2006/048659 referenced above, is to knock the baffle out of the tubular body, or puncture the baffle, for instance using a hammer and chisel. With the present invention, the curved outer surface of the baffle 3 makes it difficult for a chisel to gain purchase on the surface of the baffle thereby providing improved resistance to this form of attack. Furthermore, since there is no requirement to provide apertures in the baffle 3, the baffle can be constructed as a solid block as illustrated in FIGS. 1 to 3, which increases the strength of the baffle as compared with a conical baffle "plate" as for instance described in WO2006/048659.

Figure 5:
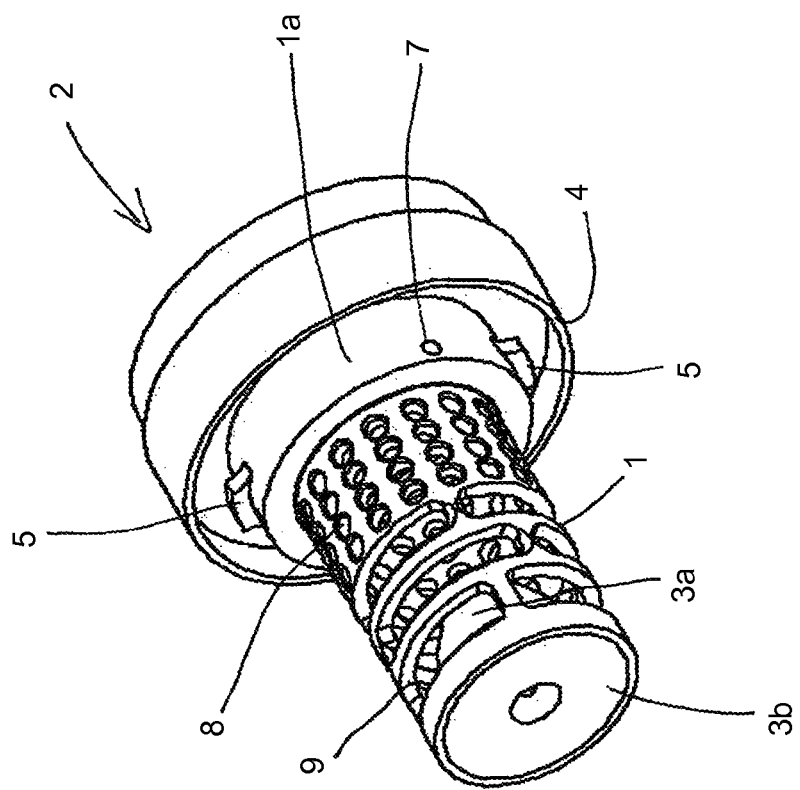
FIG. 5 is a perspective view from one end of a further embodiment of the present invention.
Figure 6:
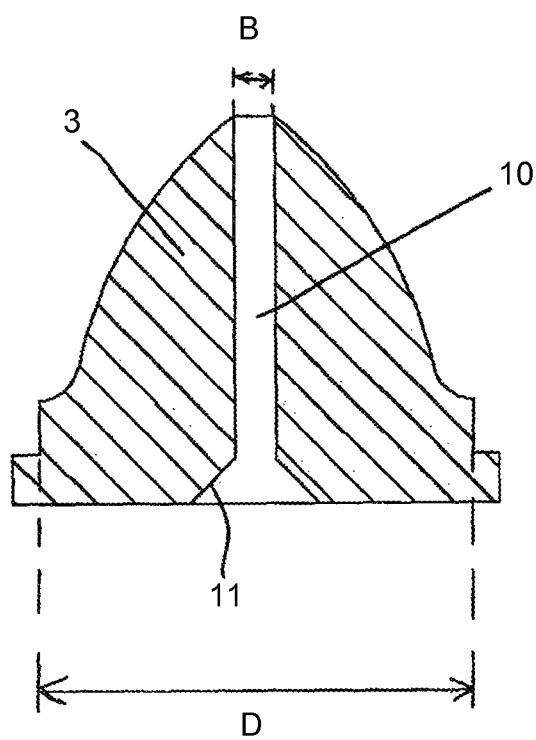
FIG. 6 is a cross section through a baffle in accordance with the embodiment of the invention shown in FIG. 5.

FIGS. 5 and 6 show a further embodiment of the invention in which the baffle 3 additionally comprises an axial bore 10 which passes from the apex of the domed surface 3a to the bottom surface 3b. As stated above, an advantage of the present invention is that, due to a reduction in turbulence in the fluid within the inlet, the length of the tubular body may be reduced, for a given fuel dispensing rate, compared to known anti-siphon inlets. The reduction in length of the tubular body is advantageous in that it limits the amount of fuel that might be siphoned from a full fuel tank.

As fuel is delivered to the fuel tank via the anti-siphon inlet, the fuel displaces air in the fuel tank, which to prevent pressure build up, must return to the atmosphere via the fuel inlet and hence the anti-siphon inlet. Due to the close proximity between the tubular body and the fuel inlet pipe within which it is received, airflow from the fuel tank via the holes 8 and slots 9 to the atmosphere is restricted. It is thought that the restriction in airflow results in pressure build-up within the fuel tank which opposes the ingress of the delivered fuel and hence reduces the maximum achievable fuel inlet rate.

It has been found that in some applications the addition of the bore 10 improves the rate of fluid flow through the anti-siphon inlet whilst filling the fuel tank. As such, the bore 10 provides a conduit through which any displaced air in the fuel tank can pass to the atmosphere without any significant impedance due to fuel flow in the opposite direction. The improved flow of displaced air out of the fuel tank leads to an improved achievable flow rate of fuel into the tank. This embodiment may be of particular use in cases where the entire length of the tubular body is received within the inlet pipe.

In one example of this embodiment of the invention the diameter D of the curved baffle surface is 49 mm and the diameter B of the bore 10 is 4.7 mm. As a result, the area of the base of the curved baffle surface is approximately 1885 mm2 and the cross-sectional area of the bore 10 is approximately 17.35 mm2. As such it is preferable that the cross-sectional area of the bore is approximately 2 orders of magnitude less than the area of the base of the baffle surface. It is preferable that the relative cross-sectional area of the bore 10 is small enough such that a siphon pipe cannot fit through the bore 10 and/or such that the volume of fuel which may pass through the bore 10 is not sufficient so as to significantly restrict the outward flow of air via the bore 10. Increasing the relative cross-sectional area of the bore 10 will permit a greater flow of displaced air through the bore 10 and as such will enable a greater fuel supply rate.

The bore 10 is additionally countersunk 11 at the end opening to the bottom surface 3b of the baffle 3. The countersink 11 aids the passage of air through the baffle bore 10 in a direction towards atmosphere as it reduces friction and turbulence that would otherwise occur at the opening to a bore 10 which has not been countersunk. It will be appreciated that the presence of the countersink 11 is desirable, however, in some embodiments it may be omitted.

It will be appreciated that many modifications may be made to the embodiments of the invention described above. For instance, the mounting structure 2 may vary from that illustrated and may have any form suitable for attachment to the inlet of a vehicle fuel tank (or any other tank) to which the anti-siphon inlet is to be fitted. For instance, in some embodiments a simple radially extending flange provided at the proximal end of the tubular body 1 may be sufficient, particularly for example where the tank inlet does not have a cylindrical neck but is simply an aperture in a wall of the tank.

Similarly, it will be appreciated that the configuration of apertures provided through the tubular body 1 may vary significantly from that illustrated. For instance, a different array of apertures such for instance as described in WO2006/048659 may be provided.

It will also be appreciated that the detailed dimensions and configurations of the domed baffle 3 may vary from that illustrated without departing from the present invention.

In conclusion, the invention provides novel systems, devices, methods and arrangements for anti-siphon inlets. While detailed descriptions of one or more embodiments of the invention have been given above, various alternatives, modifications, and equivalents will be apparent to those skilled in the art without varying from the spirit of the invention. For example, while anti-siphon inlets adapted for fitting to vehicle fuel tanks have been discussed, one or ordinary skill in the art will recognize applications to other fluid tanks or containers. Therefore, the above description should not be taken as limiting the scope of the invention, which is defined by the appended claims.

What is claimed is:

1. A fluid tank inlet device comprising:
a tubular inlet body having a central bore defined by a tubular wall and having a longitudinal axis;
the tubular wall defining an open proximal end for receiving fuel;
a plurality of apertures provided through the tubular wall for egress of fuel;
wherein the distal end of the tubular body is blocked by a baffle defining a baffle surface facing into the bore of the tubular body;
wherein at least a portion of the baffle surface is inclined at an acute angle relative to the longitudinal axis to deflect fuel towards apertures in the tubular wall;
wherein the baffle surface is at least substantially free from apertures; and
wherein a peripheral portion of a base of the baffle curves radially outwards towards the tubular wall such that the peripheral portion defines a concave portion of the baffle surface which faces the tubular body.

2. A fluid tank inlet device according to claim 1, wherein no more than 25% of the baffled surface is apertured.

3. A fluid tank inlet device according to claim 1, wherein no more than 10% of the baffle surface is apertured.

4. A fluid tank inlet device according to claim 1, wherein there are no apertures in at least the inclined portion of the baffle surface.

5. A fluid tank inlet device according to claim 1, wherein the whole of the baffle surface is free from apertures.

6. A fluid tank inlet device according claim 1, wherein the surface of the baffle rises to an apex.

7. A fluid tank inlet device according to claim 6, wherein said apex lies on the axis of the tubular body.

8. A fluid tank inlet device according claim 1, wherein the baffle extends along at least 25% the length of the tubular body in a direction parallel to said axis.

9. A vehicle fluid tank inlet device according to claim 1, wherein the inclined portion of the baffle surface is defined in part by a surface of revolution of a line about a second axis, the line being a convex line so that said surface is domed.

10. A vehicle fluid tank inlet device according to claim 9, wherein the second axis is the axis of the tubular body.

11. A vehicle fluid tank inlet device comprising:
a tubular inlet body having a central bore defined by a tubular wall and having a longitudinal axis;
the tubular wall defining an open proximal end for receiving fuel;
a plurality of apertures provided through the tubular wall for egress of fuel;
wherein the distal end of the tubular body is blocked by a baffle defining a baffle surface facing into the bore of the tubular body,
wherein at least a portion of the baffle surface is inclined at an acute angle relative to the axis to deflect fuel towards apertures in the tubular wall; and
wherein the baffle surface has a single bore, said bore being configured such that it is small enough such that a siphon pipe cannot fit through the bore and said bore being configured, in use, to allow the passage of air therethrough, wherein the cross-sectional area of the bore is approximately 2 orders of magnitude less than the area of the bottom surface of the baffle.

12. A vehicle fluid tank inlet device according to claim 11, wherein the bore is axial.

13. A vehicle fluid tank inlet device according to claim 11, wherein the baffle has a bottom surface and wherein the baffle surface rises to an apex, and wherein the bore extends from said apex to the bottom surface of the baffle.

14. A vehicle fluid tank inlet device according to claim 11, wherein the bore is countersunk at the end opening to the bottom surface of the baffle.

15. A vehicle fluid tank inlet device according to claim 11, wherein no more than 25% of the baffle surface is apertured.

16. A vehicle fluid tank inlet device according claim 11, wherein no more than 10% of the baffle surface is apertured.

17. A vehicle fluid tank inlet device according to any claim 11, wherein there are no apertures in at least the inclined portion of the baffle surface.

18. A vehicle fluid tank inlet device according to claim 11, wherein the surface of the baffle rises to an apex and wherein said apex lies on the axis of the tubular body.

19. A vehicle fluid tank inlet according to claim 11, wherein a peripheral portion of a base of the baffle curves radially outwards towards the tubular wall.

20. A vehicle fluid tank inlet device according to claim 11, wherein the baffle extends along at least 25% the length of the tubular body in a direction parallel to said axis.

* * * * *